March 22, 1955  R. B. TRUSLER ET AL  2,704,731
PROCESS FOR TREATING FABRICS
Filed Aug. 13, 1952
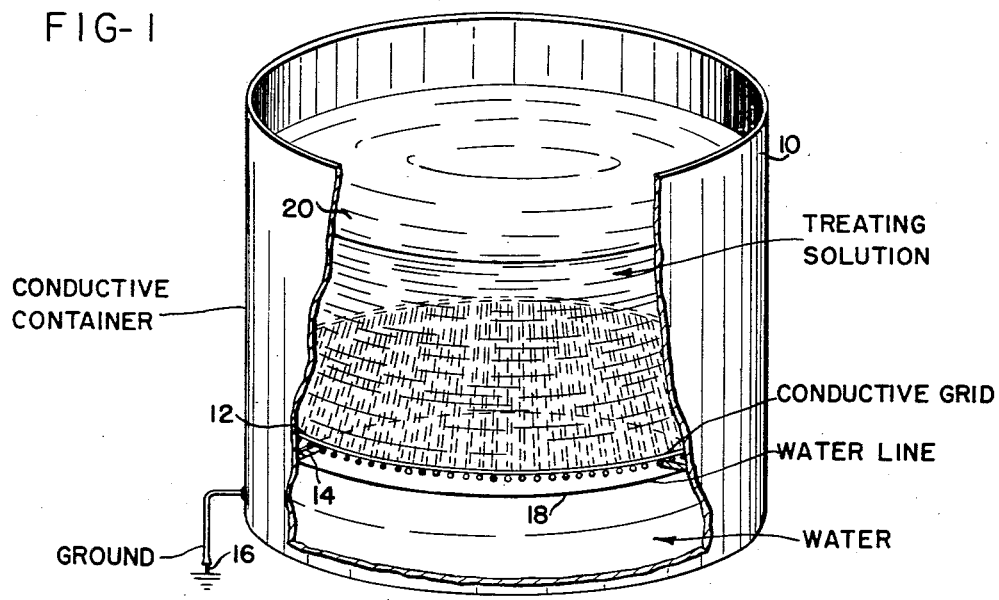
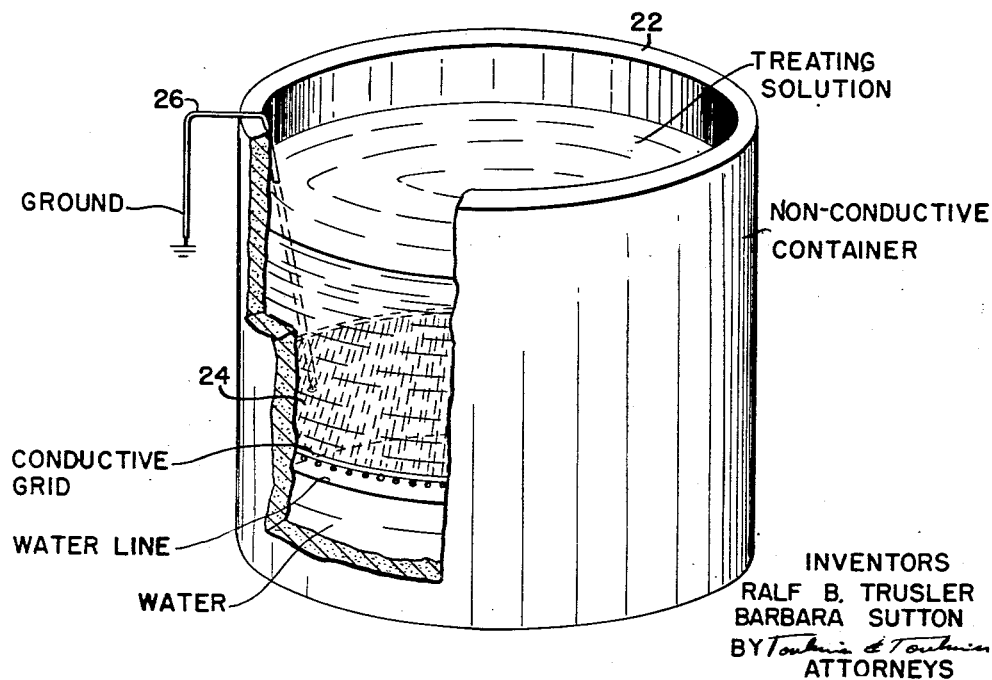
INVENTORS
RALF B. TRUSLER
BARBARA SUTTON
BY Toulmin & Toulmin
ATTORNEYS

United States Patent Office 2,704,731
Patented Mar. 22, 1955

2,704,731

PROCESS FOR TREATING FABRICS

Ralf B. Trusler and Barbara Sutton, Dayton, Ohio, assignors to The Davies-Young Soap Company, Dayton, Ohio, a corporation of Ohio Application August 13, 1952, Serial No. 304,134

2 Claims. (Cl. 117—113)

This invention relates to a method and apparatus for treating fabrics, particularly in connection with the treatment of fabrics for rendering them water repellent.

Fabric materials are quite often treated to make them more water repellent than they naturally would be by applying thereto a coating. The fabrics may be so treated for any of a great number of reasons, and likewise the particular type of fabric treated may vary widely. There are a number of processes known in the art for applying the coating, such as by dipping, spraying and the like with the water repellent material being in the form of a solution or suspension and consisting of a single effective agent or a mixture or composition thereof. Typical materials for applying protective or water repellent coatings may consist of air hardening varnishes, air drying lacquers, and solutions of other organic substances dissolved in non-aqueous solvents. A treatment of this nature may be referred to as a dry application because of the absence of water in the compositions or the solvent thereof. Among the other substances that may be employed in this manner are paraffin, waxes and resinous compounds and compositions.

It is particularly in connection with the treatment of fabrics by materials of this nature such as paraffin, waxes, both natural and synthetic, and resinous compositions and compounds that the present invention is concerned, and most particularly with the use of these materials in dipping processes.

In carrying out the dipping process with substances of the nature referred to above dissolved in a suitable organic solvent, quite erratic and unpredictable results have been obtained. This has been the case even when closest control was exercised over the treating solution and other important factors such as temperature and time of submersion of the article being treated in the solution. This has been a great drawback in the development of this important art and heretofore no suitable explanation of this phenomenon was to be had, and likewise no suitable process of treatment was available for producing uniform results.

With the foregoing in mind, it is a particular object of the present invention to provide a method and apparatus for rendering fabrics water repellent in the manner referred to above so that uniform and reproducible results will be obtained.

Another object is the provision of a method and apparatus of the nature referred to, in connection with which the proper treatment of fabrics, to render them water repellent can easily be carried out even by an unskilled operator.

It is still another object of this invention to provide a method and apparatus for treating fabrics to make them water repellent in the manner referred to above, and in which it is not necessary to observe any particular precautions in the handling of the fabric in order to obtain good results.

The foregoing objects and advantages and still other objects and advantages of this invention will become more apparent upon reference to the following specification taken in connection with the accompanying drawings, in which:

Figure 1 is a perspective view partly broken away of an apparatus for carrying out the method of this invention in which the container is electrically conductive; and Figure 2 is a view like Figure 1 but shows the form which the apparatus takes when the container is electrically non-conductive.

In general, in the practice of this invention, a fabric that is to be rendered water repellent is dipped in the treating solution, and is then removed and, after becoming thoroughly impregnated with the solution, is then dried to dispel the solvent of the solution, leaving the fabric fibers properly and completely coated with the water repellent agent being employed.

In making a study of this process and of the handling of fabric materials in dry cleaning operations and the like, it has been observed that there is a considerable development of static electricity in the fabric materials, and this appears to be the cause of the erratic results that are obtained in treating the fabric, particularly with a non-aqueous solution of a water repellent.

It is further to be found in connection with this that solutions of the water repellent agent in petroleum solvents tends to develop charges of static electricity and these charges may either be negative or positive with the amount of charge, and the polarity thereof being generally determined by the particular nature of the solution and the conditions under which it is used and the amount of agitation imparted thereto.

It will be evident that under these conditions wherein the fabric can readily become charged merely by the handling thereof, and with the treatment solution being capable of developing substantial charges, substantially any condition of relative electrical charges of the fabric and solution can exist, and this leads to the erratic and unpredictable and unreproducible results that have formerly been had with this treatment.

As a specific example, a piece of ordinary cotton fabric was charged positively and then submersed in a negatively charged solution containing a resinous water repellent agent and was then dried and pressed. This fabric was found to have attained a good water repellency rating, but when the same fabric was negatively charged and then submersed in a positively charged solution of the same resinous agent it was observed to have substantially no water repellency.

This same situation has been observed to exist in connection with the waxes that are employed for water repellent agents.

In general, however, it is not found that the opposite charging of the treating solution and the fabric is desirable for obtaining a uniform high degree of water repellency. Similarly, the charge of the fabric and the treating solution with the same kind of charge does not produce uniform results, probably because of the extreme difficulty in maintaining the electrical charges thereon equal so that, in fact, one of them will be charged more positively than the other and the same erratic results referred to above will again be obtained.

The controlling of the static charges on the fabrics and solutions is thus extremely difficult and, furthermore, it is not desirable for statically charged fabrics and solutions to be located where there are apt to be combustible liquids employed, as are used in dry cleaning operations.

In treating this problem, it is found by extensive test and experiment, that good and uniform results can be obtained where both the fabric and the solution of water repellent have zero or ground potential. By having both the fabric and treating solution thus characterized but having neither positive nor negative electrical charges, a practical commercial process for treating fabrics by immersion can be arrived at.

However, solvents and water repellent agents such as waxes dissolved therein and being of a dry nature, that is, having no water in the mixture, are good insulating materials and they do not readily lose a charge of static electricity developed therein. Similarly, with extremely dry fabrics, not only are charges readily developed thereon, but so long as they are dry and in a dry atmosphere they tend to retain the charge.

It can readily be demonstrated that damp fabrics not only do not develop static charges readily, but if they do become charged will lose the charge quickly. Thus, it will be found that fabrics which are somewhat damp, and thus in an electrically conductive condition, will obtain a greater water repellency when treated in a solution of water repellent than when they are dipped in a dry condition and thus are possessed of some electrical charge.

Having reference now to the drawings in this application, there is illustrated two arrangements which have been found satisfactory for the purpose of carrying out the process of this invention, taking into account the important factors which have been referred to above.

In Figure 1, for example, there is an electrically conductive container, preferably of metal, at 10 and within which, at a level spaced upwardly from the bottom, there is an electrically conductive grid 12 which may be supported on the container and in electrical contact therewith as by the clips 14.

The container 10 is connected to ground at 16 whereby any electrical charge on the container will immediately leak off to ground.

In the bottom of the container is water whose upper level is represented by the water line 18 which is below the conductive grid 12. Extending from water line 18 upwardly to a substantial distance above grid 12 is the treating solution 20 which may consist of any of the solutions referred to above, or any of the other dry solutions suitable for imparting water repellency to fabrics.

In operation, the dipping or introducing of fabrics into solution 20 and removing of fabrics therefrom will cause some movement of the solution and the water which will bring about some dispersing of the water in the treating solution. No severe agitation of the water will be had in normal operation because of the grid 12, and this grid likewise supports the fabrics in spaced relation to the water.

The effect of the slight amount of water that is dispersed in the solution in the manner described is to make the solution electrically conductive so that any charge thereon will pass to the container or through the grid to the container and then leak off to ground. Similarly, any charges that will be on the fabrics when they are placed in the solution will also leak off in the same manner.

As an example of the manner in which the water is effective in proving the water repellent treatment of fabrics, a treating solution was made of 93 parts by weight of a dry cleaning solvent, 4 parts by weight of paraffin having a melting point of 133 to 135 degrees F., and 3 parts of a phenolformaldehyde resin.

Upon placing a quantity of water into this solution and agitating the solution for a short time and then halting the agitation and permitting the suspended water to settle, a treating solution saturated with moisture was obtained.

Upon dipping a piece of ordinary khaki poplin in the solution and then drying and pressing the poplin it was found to have obtained a water repellency rating of 100 percent by a standard test method. In the same solution the same fabric acquired only a 40 percent water repellent rating, measured by the same method, when the fabric was treated in the solution before the moisture was added thereto.

The adding of moisture to the solution in the manner of the specific example referred to above, however, is neither safe nor practical for commercial practices, because a mechanical stirring device is necessary requiring a drive motor and which motor would have to be an expensive explosion-proof motor. Further, the agitator would have to be removed from the solution before fabrics were introduced therein. Further still, this method of wetting the solution will also tend to wet the sides and bottom of the container, and this could damage certain fabrics that might be treated in the solution.

The method of supplying the water to the solution according to this invention entirely overcomes the difficulties referred to above by eliminating the mechanical stirring device, and thus also the necessity for removing any stirring device from the tank before introducing fabrics, and also prevents the fabrics being treated from ever coming into direct contact with the water.

As an alternative to the Figure 1 arrangement, the Figure 2 arrangement can be employed wherein the container 22 is of non-conductive material such as ceramic or wood, and the grid 24 is then connected directly to a ground point as by ground wire 26. In all other respects, the Figure 2 arrangement is the same as illustrated in Figure 1.

Both of the illustrated arrangements are characterized in the feature of supporting the treatment solution on the water, and providing an electrically conductive and grounded barrier above the level of the water, and which barrier permits a controlled amount of water to enter the solution due to the agitation of the solution in use.

While this invention has been specifically described in connection with the waterproofing of fabrics of textile material such as outer garments, tents and the like, it is to be understood that the invention is useful in the imparting of water repellency characteristics to substantially any material that may be subjected to this treatment. For example, paper and paper products, fibrous materials, both as to the felted and matted type, and of the woven type, and all manner of textile materials, whether woven, knitted or felted, are adapted for being treated according to the process of this invention and with the disclosed apparatus.

It will be understood that this invention is susceptible to modification in order to adapt it to different usages and conditions, and, accordingly, it is desired to comprehend such modifications within this invention as may fall within the scope of the appended claims.

We claim:

1. A method of uniformly applying a water-repellent to absorptive articles which comprises immersing the article to be rendered water-repellent in a body of water and a non-aqueous dry cleaning solvent solution of a water-repellent selected from the group consisting of resins and waxes disposed above the water and having a highly conductive, horizontally extending stationary grid connected to ground supported therein adjacent the bottom thereof but above the top of the water, said article being immersed in the portion of the solution above the grid, and removing the article treated with the water-repellent from said portion, the immersion and removal of the article being sufficient to effect movement of the solution and of the water to cause dispersion of the water through the grid into the solution in a limited amount sufficient to render the solution conductive of static electricity and to conduct any electric charge on the solution which will then leak off to ground through the grid.

2. A method of uniformly applying a water-repellent to absorptive articles which comprises immersing the article to be rendered water-repellent in a body of water and a non-aqueous dry cleaning solvent solution of a water-repellent selected from the group consisting of waxes and resins contained in an electrically conductive container connected to ground and having a horizontally extending stationary grid electrically secured to the container supported therein adjacent the bottom thereof but above the top of the water, said article being immersed in the portion of the solution above the grid, and removing the article treated with the water-repellent from said portion, the immersion and removal of the article being sufficient to effect movement of the solution and of the water to cause dispersion of the water through the grid into the solution in a limited amount sufficient to render the solution conductive of static electricity and to conduct any electric charge on the solution which will then leak off to ground through the grid.

References Cited in the file of this patent

UNITED STATES PATENTS

| 1,851,015 | Olsen | Mar. 29, 1932 |
| 2,291,616 | Fletcher | Aug. 4, 1942 |
| 2,475,418 | Aitchison | July 5, 1949 |